(12) United States Patent
Fu et al.

(10) Patent No.: US 8,548,041 B2
(45) Date of Patent: Oct. 1, 2013

(54) ADAPTIVE FILTER

(75) Inventors: Chih-Ming Fu, Taichung (TW);
Yu-Wen Huang, Taipei (TW);
Shaw-Min Lei, Taipei County (TW);
Xun Guo, Beijing (CN)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 338 days.

(21) Appl. No.: 12/405,216

(22) Filed: Mar. 16, 2009

(65) Prior Publication Data

US 2010/0074323 A1 Mar. 25, 2010

Related U.S. Application Data

(60) Provisional application No. 61/099,981, filed on Sep. 25, 2008.

(51) Int. Cl.
*H04N 7/12* (2006.01)
*H04N 7/32* (2006.01)
*H04N 11/02* (2006.01)

(52) U.S. Cl.
USPC ............ 375/240.02; 375/240.12; 375/240.25; 375/240.26

(58) Field of Classification Search
USPC ....................... 375/240.01–240.29
See application file for complete search history.

(56) References Cited

U.S. PATENT DOCUMENTS

| | | | |
|---|---|---|---|
| 6,281,942 B1 | 8/2001 | Wang | |
| 7,382,294 B2 | 6/2008 | Yokose | |
| 2003/0169931 A1 | 9/2003 | Lainema | |
| 2004/0076333 A1 | 4/2004 | Zhang | |
| 2005/0078750 A1 | 4/2005 | Shen | |
| 2006/0133471 A1 | 6/2006 | Ki | |
| 2006/0139494 A1 | 6/2006 | Zhou | |
| 2006/0221760 A1 | 10/2006 | Chen | |
| 2006/0291557 A1* | 12/2006 | Tourapis | 375/240.12 |
| 2007/0064816 A1 | 3/2007 | Chiang | |
| 2007/0104269 A1 | 5/2007 | Xue | |
| 2007/0133687 A1* | 6/2007 | Wittmann et al. | 375/240.17 |
| 2008/0175322 A1 | 7/2008 | Lee | |

(Continued)

FOREIGN PATENT DOCUMENTS

| | | |
|---|---|---|
| CN | 1571515 A | 1/2005 |
| CN | 1607836 A | 4/2005 |

(Continued)

OTHER PUBLICATIONS

Fu et al., Title of Invention: Adaptive Interpolation Filter for Video Coding, U.S. Appl. No. 12/405,250, filed Mar. 17, 2009.

(Continued)

*Primary Examiner* — Joseph Ustaris
*Assistant Examiner* — On S Mung
(74) *Attorney, Agent, or Firm* — Winston Hsu; Scott Margo

(57) ABSTRACT

A video encoder that utilizes adaptive loop filtering for coding video data includes: a prediction unit, for performing prediction techniques according to original video data and reconstructed video data to generate predicted samples; a reconstruction unit, for reconstructing the predicted samples to form the reconstructed video data; a reference picture buffer, for storing the reconstructed video data; a filter parameter estimator, for estimating filter parameters according to the original video data and the reconstructed video data; and an adaptive filter, for utilizing the stored filter parameters to perform filtering on the reconstructed video data.

25 Claims, 15 Drawing Sheets

(56) References Cited

U.S. PATENT DOCUMENTS

| | | | |
|---|---|---|---|
| 2008/0192823 A1 | 8/2008 | Wang | |
| 2008/0205508 A1 | 8/2008 | Ziauddin | |
| 2008/0219374 A1 | 9/2008 | Fernandez-Corbaton | |
| 2008/0240253 A1* | 10/2008 | Au et al. | 375/240.24 |
| 2008/0247467 A1* | 10/2008 | Rusanovskyy et al. | 375/240.16 |
| 2009/0257670 A1 | 10/2009 | Chiu | |
| 2009/0290637 A1* | 11/2009 | Lai et al. | 375/240.02 |
| 2010/0002770 A1 | 1/2010 | Motta | |
| 2010/0008417 A1* | 1/2010 | Xu et al. | 375/240.02 |
| 2010/0014763 A1* | 1/2010 | Wittmann et al. | 382/233 |
| 2010/0021071 A1* | 1/2010 | Wittmann et al. | 382/232 |

FOREIGN PATENT DOCUMENTS

| | | | |
|---|---|---|---|
| CN | 1964490 A | | 5/2007 |
| CN | 101018337 A | | 8/2007 |
| JP | 2004147328 A | | 5/2004 |
| WO | 2008010929 A2 | | 1/2008 |
| WO | 2008010929 A3 | | 1/2008 |
| WO | 2008037113 A1 | | 4/2008 |
| WO | 2008084378 A2 | | 7/2008 |
| WO | 2008084378 A3 | | 7/2008 |

OTHER PUBLICATIONS

Fu et al., Title of Invention: Adaptive Filter, U.S. Appl. No. 12/405,251, filed Mar. 17, 2009.

International application No. PCT/CN2009/072192, International filing date: Jun. 9, 2009, International Searching Report mailing date: Sep. 17, 2009.

International application No. PCT/CN2009/072191, International filing date: Jun. 9, 2009, International Searching Report mailing date: Sep. 17, 2009.

International application No. PCT/CN2009/072196, International filing date: Jun. 9, 2009, International Searching Report mailing date: Sep. 17, 2009.

* cited by examiner

ADAPTIVE FILTER

CROSS REFERENCE TO RELATED APPLICATIONS

This application claims the benefit of U.S. Provisional Application No. 61/099,981, which was filed on Sep. 25, 2008, and is included herein by reference.

BACKGROUND

Current video coding methods employ a wide variety of techniques such as motion estimation, motion compensation, deblocking, and filtering for video compression. Conventional methods use a differential coding loop, wherein a video picture is broken down into blocks, undergoes prediction coding, and is then reconstructed and used as reference for a next picture undergoing prediction coding.

Recent developments in coding have utilized in-loop Wiener filters to further improve the quality of coded pictures. A Wiener filter works to reduce the error between an original signal and a noisy signal (a signal with certain errors inherent as a result of the coding process). Wiener filters first use an autocorrelation matrix and crosscorrelation vectors to estimate filter parameters. This estimation typically occurs after the deblocking stage. Please refer to FIG. 1. FIG. 1 is a diagram of a conventional video encoder including an adaptive loop filter in the differential coding loop. The video encoder 100 comprises a motion estimation/motion compensation (ME/MC) block 110; an intra prediction block 105; a macroblock mode decision block 155; a transform/quantization (T/Q) block 140; an inverse transform/inverse quantization (IT/IQ) block 145; a reconstruction unit 135; a deblocking unit 130; an entropy coding unit 150; a filter parameter estimator 125; an adaptive loop filter 120; and a reference picture buffer 115. Wiener-Hopf equations are formed and solved by the filter parameter estimator 125 to estimate the filter parameters. These equations are formed by accessing the original picture (from the input) and the deblocked picture (from the deblocking unit 130), for calculating the autocorrelation of the deblocked signal (i.e. a to-be-filtered signal) and the crosscorrelation between the original signal (from the input) and the deblocked signal, where the two accesses are done simultaneously. This is known as a first pass. The Wiener filter coefficients must then be applied to the deblocked picture, in order to generate the signal with smaller errors. This is known as the second pass. The generated signal must then be written into the reference picture buffer 120, which stores the reconstructed pictures for future reference. These processes are illustrated in FIG. 2. As can be seen from the diagram, the conventional two-pass process requires three read operations and a write operation per pixel. Frequent DRAM access is required for these processes and therefore the encoding latency is increased.

FIG. 11 is a diagram of a conventional video decoder including an adaptive loop filter in the differential coding loop. The video decoder 1100 comprises an MC block 1120; an intra prediction block 1115; an IT/IQ block 1110; a reconstruction unit 1135; a deblocking unit 1140; an entropy decoding unit 1105; an adaptive loop filter 1130; and a reference picture buffer 1125.

Wiener filtering can also be applied in the inter prediction stage. Please refer to FIG. 3. FIG. 3 is a diagram of a conventional video encoder including an adaptive interpolation filter in the differential coding loop. The video encoder 300 comprises an ME/MC block 310; an intra prediction block 305; a macroblock mode decision block 355; a T/Q block 340; an IT/IQ block 345; a reconstruction unit 335; a deblocking unit 330; an entropy coding unit 350; a filter parameter estimator 325; an adaptive interpolation filter 320; and a reference picture buffer 315. The filter parameter estimator calculates optimal filter parameters, and the adaptive filter reduces the error between an original signal and a prediction signal. For a current picture, the optimal filter parameters are initially unknown. The filter parameter estimator forms Wiener-Hopf equations by calculating the autocorrelation of the prediction signal (i.e. a to-be-filtered signal) and the crosscorrelation between the original signal (from the input) and the prediction signal (from macroblock mode decision output), where the prediction signal is obtained by interpolating reference pictures with predefined standard 6-tap filter coefficients. Then the filter parameter estimator solves the equations to obtain the optimal filter parameters. This is known as a first pass. Next, the reference pictures of the current picture are interpolated and filtered with the optimal filter parameters for ME/MC of the second time. This is known as the second pass. The second pass can be iteratively performed until convergence. These processes are illustrated in FIG. 4. As can be seen from the flowchart, the conventional multi-pass process requires processing ME/MC twice or more. The encoding latency and complexity are both significantly increased.

FIG. 12 is a diagram of a conventional video decoder including an adaptive interpolation filter in the differential coding loop. The video decoder 1200 comprises an MC block 1220; an intra prediction block 1215; an IT/IQ block 1210; a reconstruction unit 1235; a deblocking unit 1240; an entropy decoding unit 1205; an adaptive interpolation filter 1225; and a reference picture buffer 1230.

SUMMARY

It is therefore an objective of the present invention to provide an apparatus and method for video coding that reduces the amount of DRAM access per pixel, decreases the coding latency, and decreases computation complexity.

A video encoder that utilizes adaptive loop filtering for coding video data comprises: a prediction unit, for performing prediction techniques according to original video data and reconstructed video data to generate prediction samples; a reconstruction unit, coupled to the prediction unit, for reconstructing the prediction samples to form the reconstructed video data; a reference picture buffer, for storing the reconstructed video data and the corresponding filter parameters as reference video data; a filter parameter estimator, coupled between the reconstruction unit and the reference picture buffer, for estimating filter parameters according to the original video data of a current picture and the reconstructed video data of the current picture; and an adaptive loop filter, coupled between the reference picture buffer and the prediction unit, for filtering the reference pictures according to the stored filter parameters of the corresponding reference pictures.

A method of encoding video data comprises: performing prediction techniques according to original video data and reconstructed video data to generate prediction samples; reconstructing the prediction samples to form the reconstructed video data; estimating filter parameters according to the original video data of a current picture and the reconstructed video data of the current picture; reading the reconstructed video data of a prior picture from a reference picture buffer for filtering of the reconstructed video data of the prior picture in coding order for motion estimation between the original video data of the current picture and the filtered reconstructed video data of the prior picture in coding order; and filtering the reconstructed video data of the prior picture in coding order utilizing the estimated filter parameters of the prior picture in coding order, wherein the filtered reconstructed video data of the prior picture in coding order is utilized for motion estimation.

A video decoder for decoding the encoded video data comprises: an entropy decoding unit, for parsing an encoded bitstream; a prediction unit, for performing prediction techniques according to the entropy decoding unit; a reconstruction unit, coupled to the prediction unit, for reconstructing the prediction samples to form the reconstructed video data; a reference picture buffer, for storing the reconstructed video data and corresponding decoded filter parameters from the entropy decoding unit as reference video data; and an adaptive loop filter, coupled between the reference picture buffer and the prediction unit, for filtering reference pictures according to stored filter parameters of the corresponding reference pictures.

A method of decoding video data comprises: performing entropy decoding of a bitstream; performing prediction techniques according to the entropy decoding results; reconstructing prediction samples to form reconstructed video data; reading the reconstructed video data of a prior picture from a reference picture buffer for filtering of the reconstructed video data of the prior picture in coding order for motion estimation between the original video data of a current picture and filtered reconstructed video data of the prior picture in coding order; and filtering the reconstructed video data of the prior picture in coding order utilizing decoded filter parameters of a prior picture in coding order, wherein the filtered reconstructed video data of the prior picture in coding order is utilized for motion estimation without writing into a memory.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide an adaptive filter in video coding that requires less access of the DRAM compared to the conventional two-pass filter process. The present invention also provides various methods for coding video data that decreases the coding latency and computation complexity.

Figure 5:
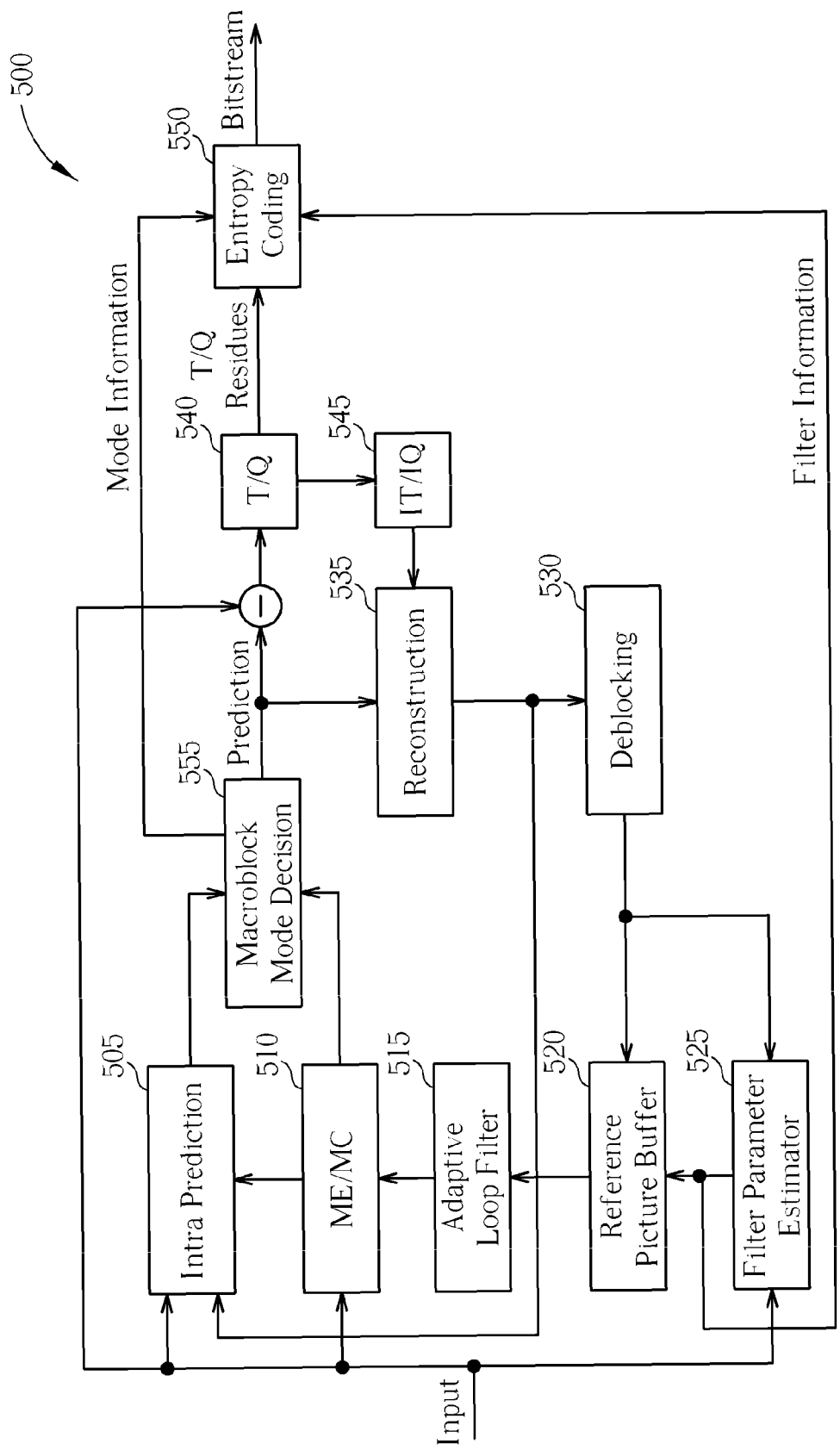
FIG. 5 is a diagram of a video encoder according to a first embodiment of the present invention.

Please refer to FIG. 5. FIG. 5 is a diagram of a video encoder 500 with an adaptive filter according to a first embodiment of the present invention. The video encoder 500 comprises: an ME/MC unit 510; an intra prediction unit 505; a macroblock mode decision unit 555; a reference picture buffer 520; an adaptive loop filter 515; a filter parameter estimator 525; a reconstruction unit 535; a deblocking unit 530; a T/Q unit 540; an IT/IQ unit 545; and an entropy coding unit 550. As can be seen from the diagram, the adaptive filter is in two parts: the first part, filter parameter estimator 525, is coupled between the deblocking unit 530 and the reference picture buffer 520, and the second part, adaptive loop filter 515, is coupled between the reference picture buffer 520 and the ME/MC unit 510. As pixel data for ME/MC are buffered on-chip, ME/MC can be performed at the same time as DRAM access.

The filter parameter estimator 525 accesses the deblocked picture and the original picture, solves Wiener-Hopf equations, and then writes filter parameters to the reference picture buffer 520. Although the reference picture buffer is usually realized as a DRAM, it is possible to store the filter coefficients in an internal memory such as a cache, an SRAM, or registers.

The Wiener-Hopf equations for one dimension (1-D) or two dimension (2-D) finite impulse response (FIR) filter are solved by first generating an autocorrelation matrix of deblocked pixels (i.e. a to-be-filtered signal) and a crosscorrelation vector between the original pixels and the deblocked pixels. The filter coefficients are computed by solving the Wiener-Hopf equations. The deblocked picture has also been written to the reference picture buffer 520, and the filter parameters will be stored therein with the corresponding picture. In one embodiment, once a reference picture is removed from the reference picture buffer 520, the corresponding filter parameters can also be removed. The filter parameter estimator 525 will then carry out the same process for a next picture from the deblocking unit 530. At the same time, the adaptive loop filter 515 accesses a prior picture in coding order and its corresponding filter parameters from the reference picture buffer 520 and applies the filter parameters to the prior picture before the picture undergoes ME/MC processes. In this way, the deblocked picture and the reference picture buffer 520 only need to be accessed once for each pixel. The filtering takes place in the adaptive loop filter 515 and the filtered picture can then be immediately sent to the ME/MC unit 510. In some embodiments, the adaptive loop filter 515 can be combined with the interpolation process in the ME/MC processes. As compared to the prior art, this filtered picture does not need to be written into the reference picture buffer 520. Furthermore, as the reference picture buffer 520 needs to be read anyway for determining ME/MC data such as search range data, reading of the reference picture by adaptive loop filter 515 saves one read and one write as compared to the prior art, and DRAM access by filter parameter estimator 525 at the same time ME/MC is performed will not affect DRAM latency, as ME/MC data are typically buffered on-chip.

Figure 6:
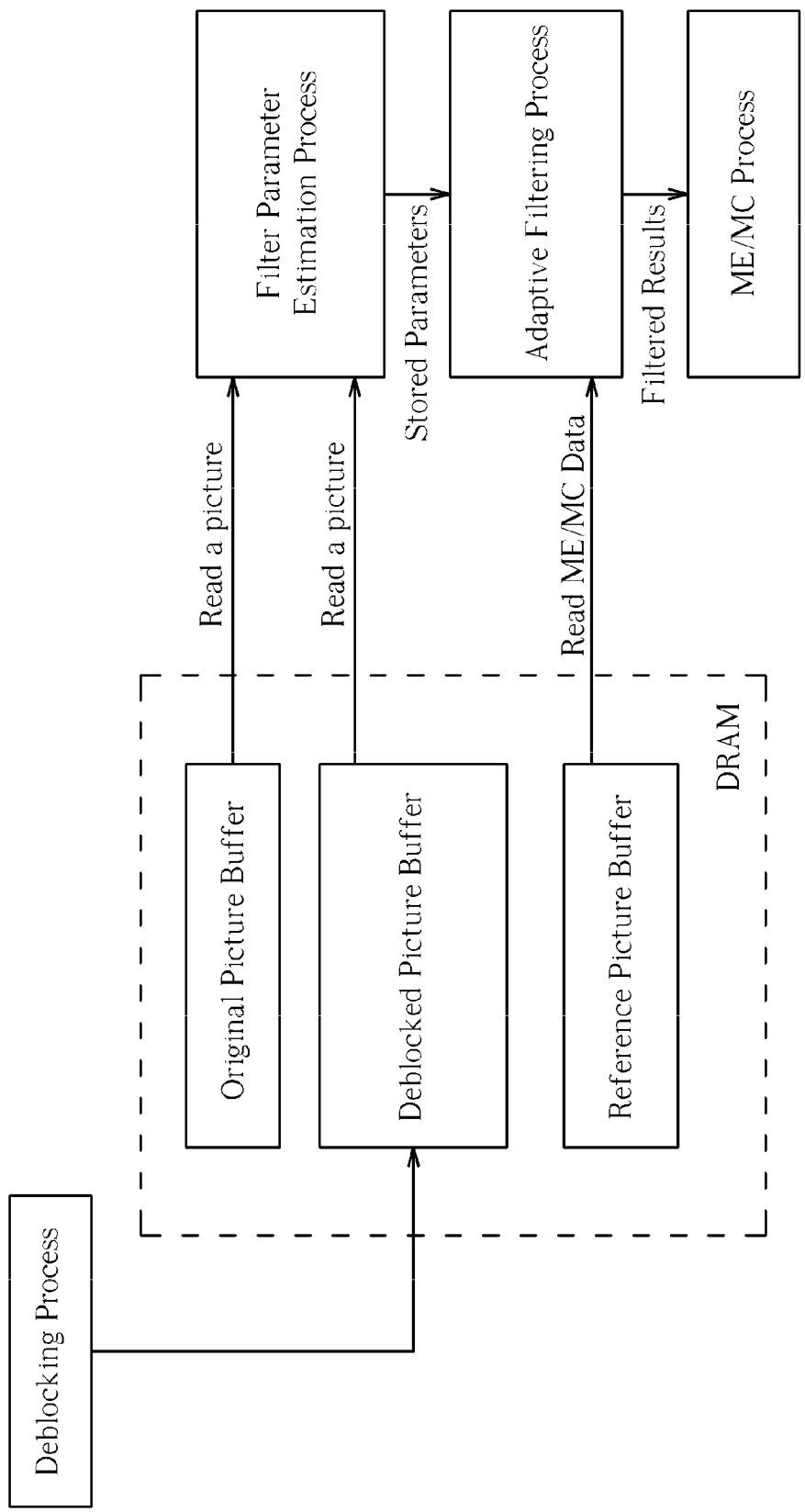
FIG. 6 is a diagram illustrating DRAM access for the video encoder shown in FIG. 5.

Therefore, a one-pass algorithm for adaptive loop filtering is achieved. This is illustrated in FIG. 6.

In addition, this one-pass algorithm can be turned on or off by evaluating the performance of adopting the adaptive method. For example, cost functions/rate-distortion criteria are utilized to determine the benefits of performing a certain process on a certain pixel. A rate-distortion criterion can be expressed as:

$$\Delta j = \Delta D + \lambda \Delta R$$

where $\Delta R$=parameter bits, and $\Delta D = D_{filter\ on} - D_{filter\ off}$ If $\Delta J<0$ the filter should be turned on. Otherwise, the filter does not need to be utilized.

Taking the circuit shown in FIG. 5 for example, the rate-distortion criterion for a first picture can determine if adaptive filtering should be performed or not. The term, $D_{filter\ on}$, in the cost function can be properly estimated without actually filtering the deblocked picture. However, the autocorrelation matrix and the cross correlation vector must still be calculated in order to approximate $D_{filter\ on}$ and in turn to estimate $\Delta D$, and the filter parameters must still be solved in order to estimate $\Delta R$. The use of the one-pass algorithm will significantly reduce complexity in calculating the rate-distortion determination. In an embodiment, the filter parameter estimator comprises a Wiener filter parameter generation unit, for determining the Wiener filter parameters, and a rate-distortion determination unit, for performing a rate-distortion criterion to determine whether or not to activate the adaptive loop filter, for performing the filtering according to the generated filter parameters.

In addition, it is not necessary to perform filtering decision on an entire picture. It is possible that only certain regions of a picture require filtering. The one-pass algorithm is therefore also highly suitable for region based rate-distortion determination. This region-based rate-distortion determination can be expressed as:

$$\Delta J_{mm} = \Delta D_m + \lambda \Delta R_m$$

where $\Delta R_m$=parameter bits, and $\Delta D_m = D_{m,\ filter\ on} - D_{m,\ filter\ off}$ If $\Delta J_m < 0$ the filter should be turned on. Otherwise, the filter does not need to be utilized for region m.

As the one-pass adaptive filter means that actual filtering is not required for making a rate-distortion determination, there is no need for providing a temporal picture memory to store filtering results.

Conventional encoding often incorporates an interpolation filter for improving the precision of the encoding process. As the interpolation filter is typically a linear filter, it can be combined with the adaptive loop filter, 515 without necessitating additional access of the DRAM. When the adaptive loop filter and interpolation filter are combined as two cascading functional blocks, the adaptive loop filter will process the integer pixels first, so the interpolation is performed with respect to filtered integer pixels. Since interpolation and adaptive loop filtering are linear processes, they can also be further combined into one multi-function block in order to share multiplications. The two combination methods both ensure that the quality of the reconstructed picture is improved, while still only requiring single access of the DRAM.

Figure 7:
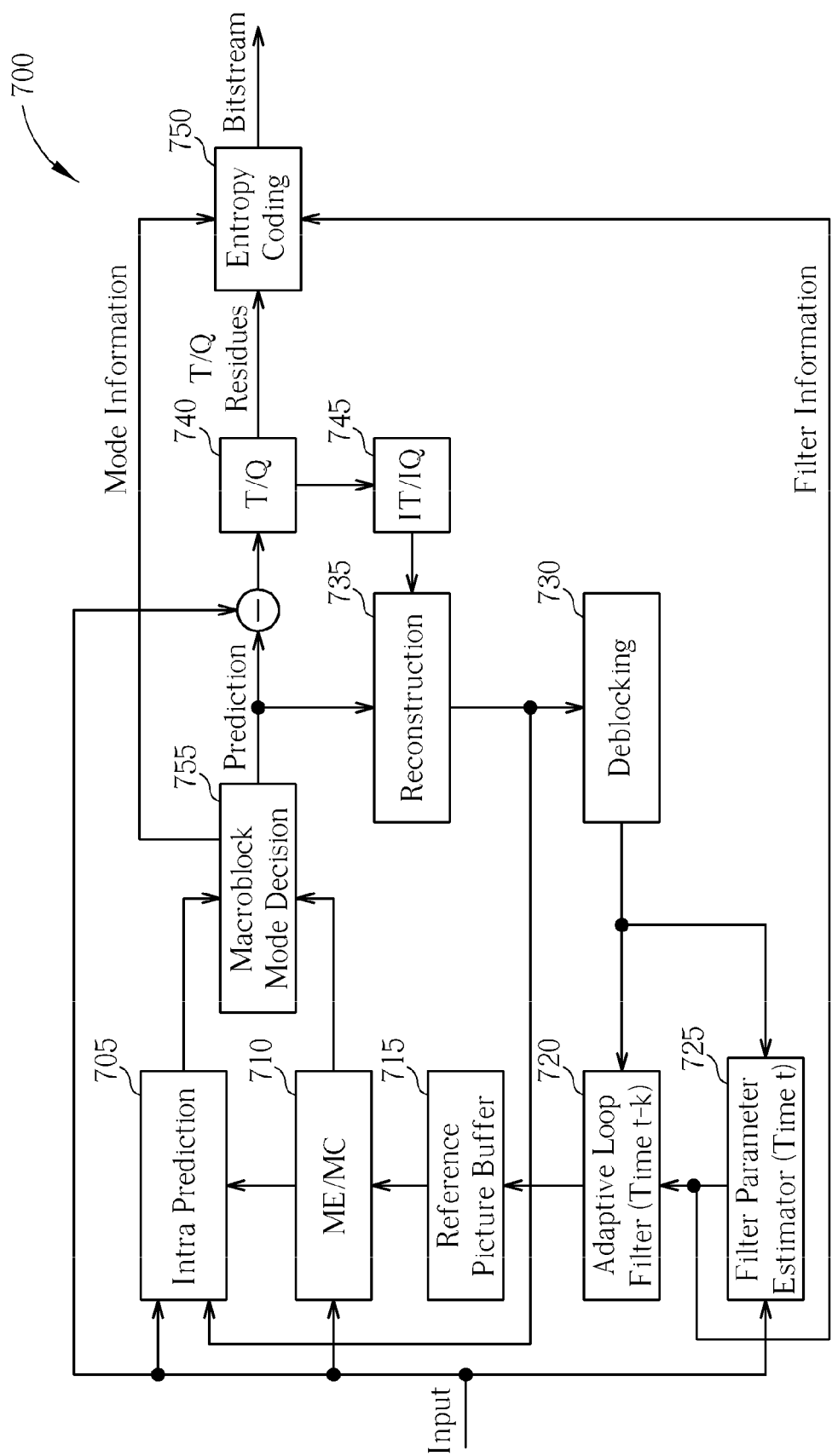
FIG. 7 is a diagram of a video encoder according to a second embodiment of the present invention.
Figure 8:
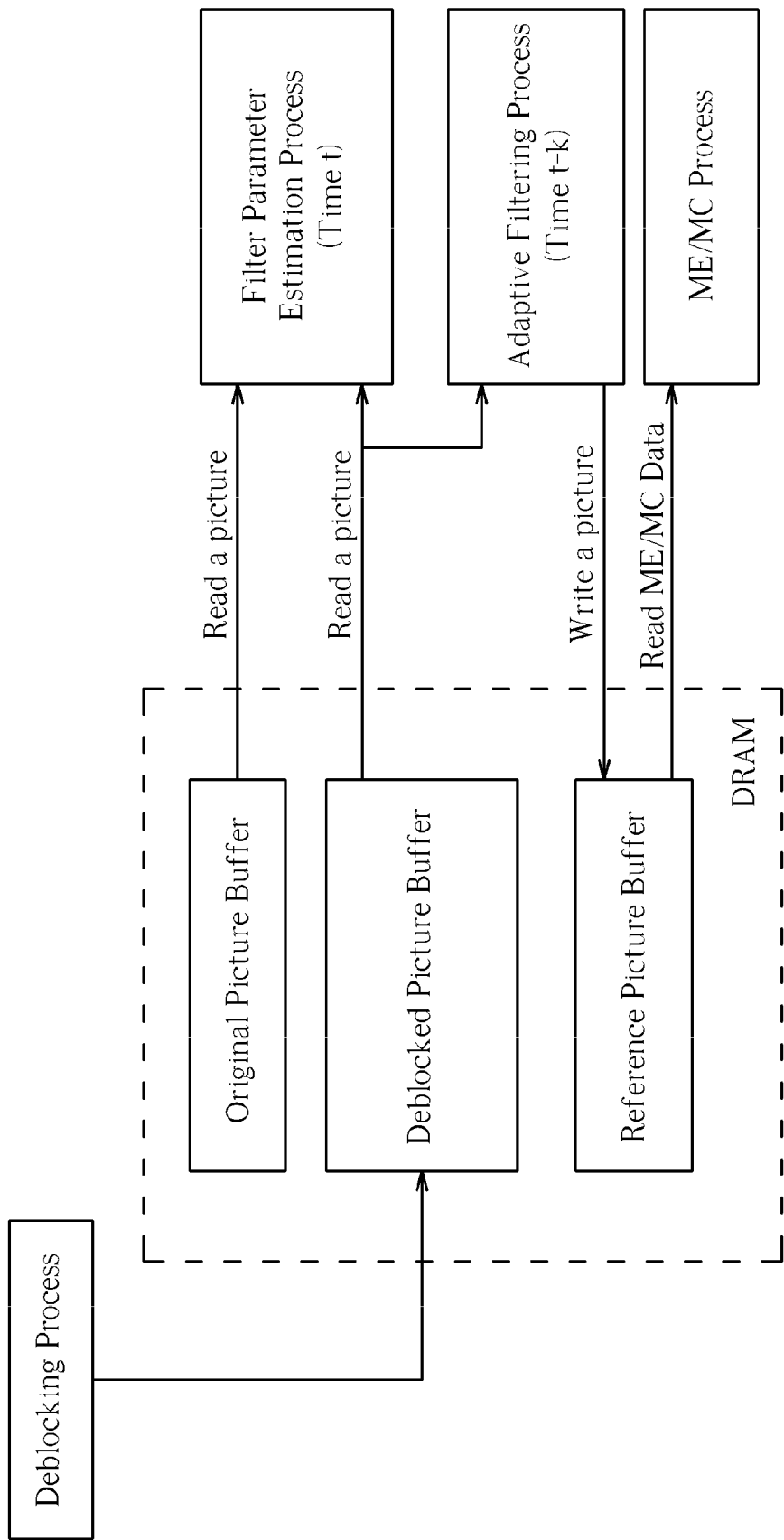
FIG. 8 is a diagram illustrating DRAM access for the video encoder shown in FIG. 7.

In addition, a number of methods are provided for reducing DRAM access latency. A first method assumes that the change between two consecutive pictures is not significant, and therefore takes a prior picture's filter parameters as parameters for the current picture. In this way, estimation of filter parameters and filtering of a picture can be performed in parallel, thereby achieving one-pass picture data access without separating the filter parameter estimator and the adaptive loop filter by the reference picture buffer. The above-mentioned one-pass architecture or region-based filtering can also be applied to this concept. It should be noted that this modification does not require two adaptive loop filters, as a single adaptive loop filter only utilizes a single-pass algorithm as estimation of filter parameters and filtering of the picture are performed in parallel. Please refer to FIG. 7. FIG. 7 is a diagram of a video encoder 700 according to a second embodiment of the invention. The video encoder 700 comprises: an ME/MC unit 710; an intra prediction unit 705; a macroblock mode decision unit 755; a reference picture buffer 715; an adaptive loop filter 720; a filter parameter estimator 725; a reconstruction unit 735; a deblocking unit 730; a T/Q unit 740; an IT/IQ unit 745; and an entropy coding unit 750. As can be seen from the diagram, the adaptive filter is in two parts: the first part, filter parameter estimator 725, is coupled between the deblocking unit 730 and adaptive loop filter 720, and the second part, the adaptive loop filter 720, is coupled between the deblocking unit 730 and the reference picture buffer 715. When the deblocking unit 730 outputs a current picture, the filter parameter estimator 725 will estimate filter parameters of the current picture while the adaptive loop filter 720 will filter the current picture according to previously estimated filter parameters. This only requires a single access of the DRAM, and therefore one-pass filtering is achieved. The DRAM access requirements are illustrated in FIG. 8. It is noted that variations of this method such as applying filter parameters corresponding to any one of the prior pictures, such as t-1 picture in coding order when k=1, t-2 picture in coding order when k=2, and any pre-defined filter parameters also obey the spirit of the present invention. The adaptive loop filter of considering filter parameters corresponding to prior picture in coding order is called time-delayed adaptive loop filter design.

Figure 1:
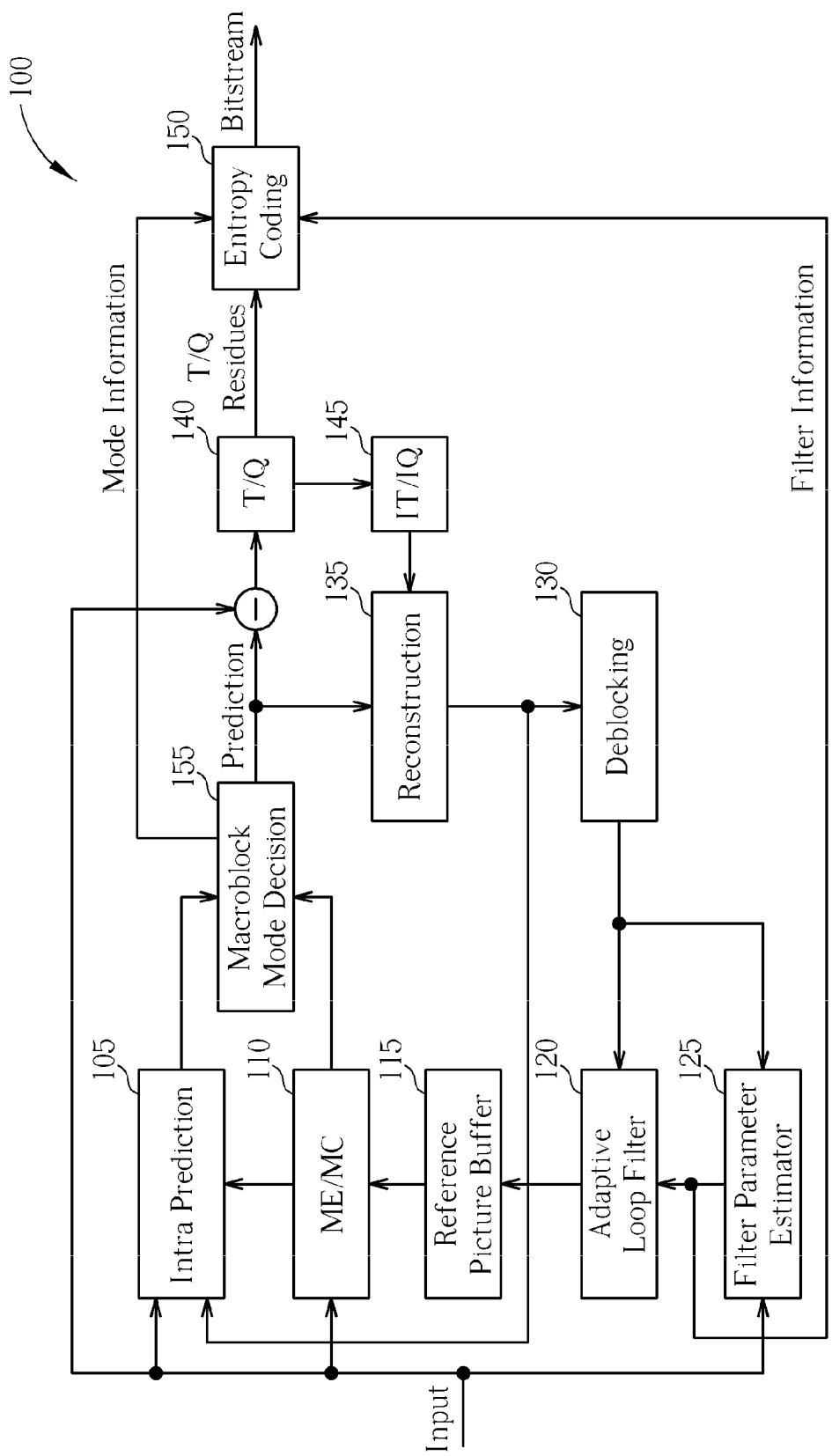
FIG. 1 is a diagram of a video encoder according to the prior art of adaptive loop filtering.
Figure 2:
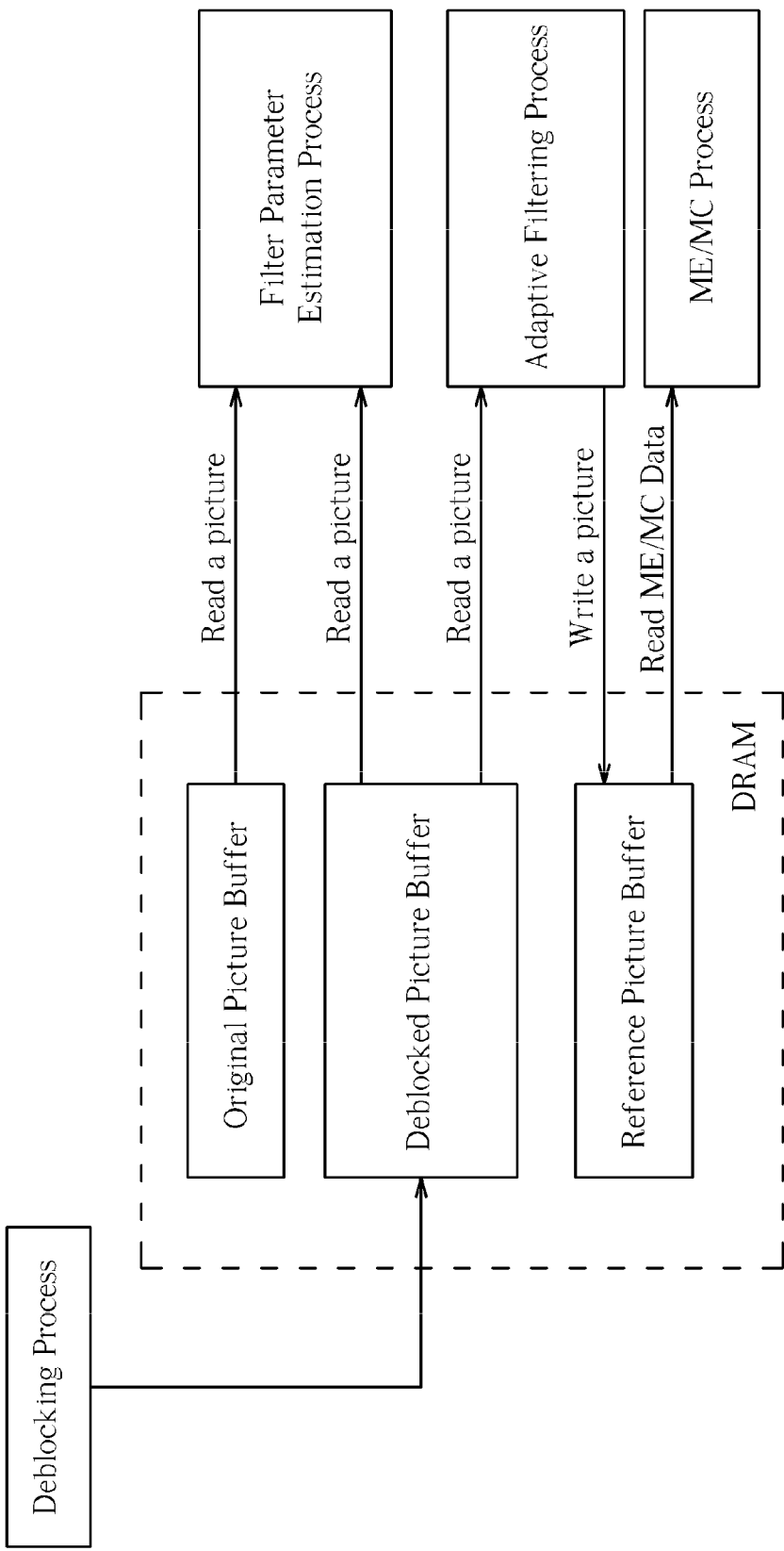
FIG. 2 is a diagram illustrating DRAM access for the video encoder shown in FIG. 1.
Figure 3:
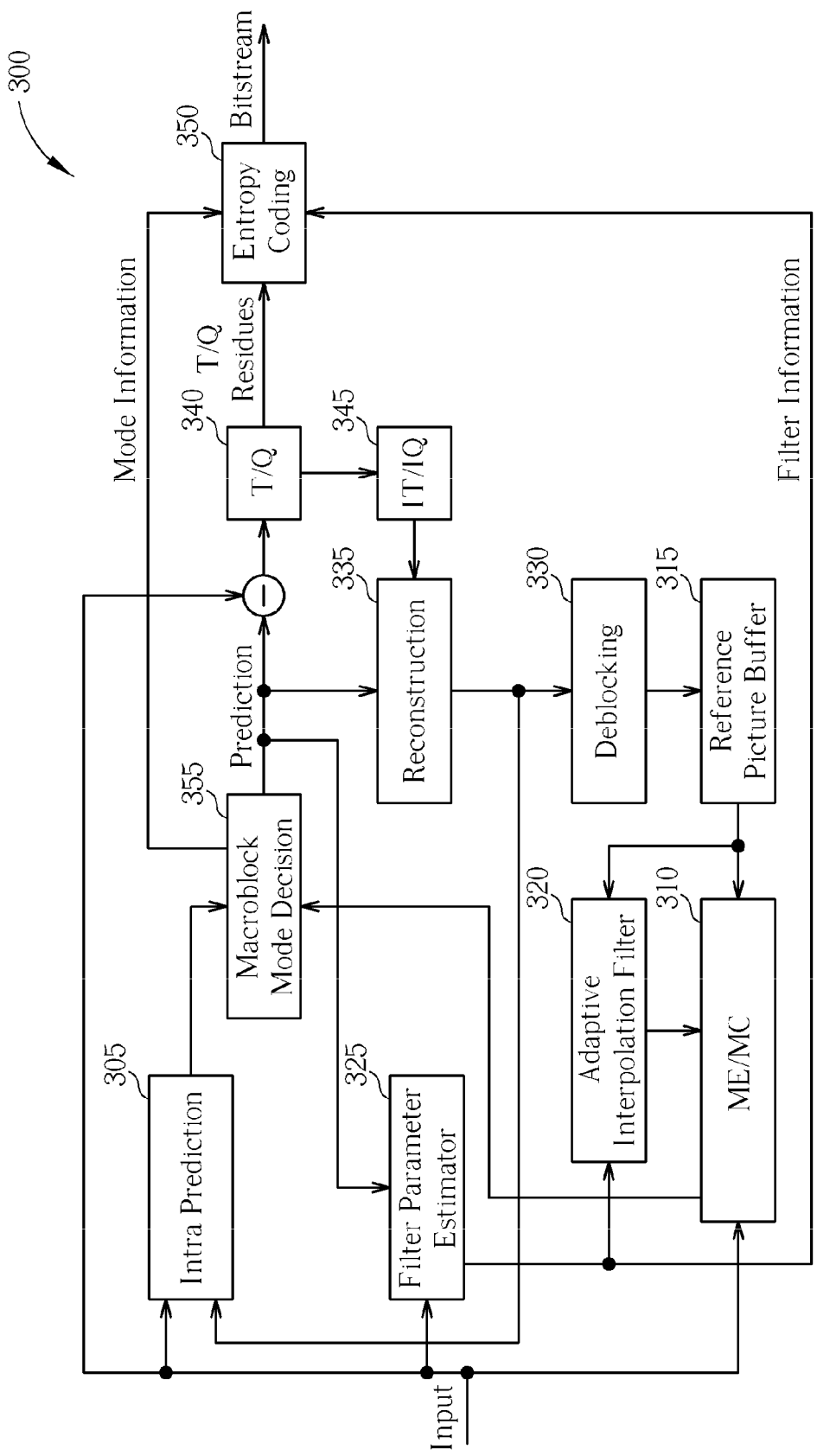
FIG. 3 is a diagram of a video encoder according to the prior art of adaptive interpolation filtering.
Figure 4:
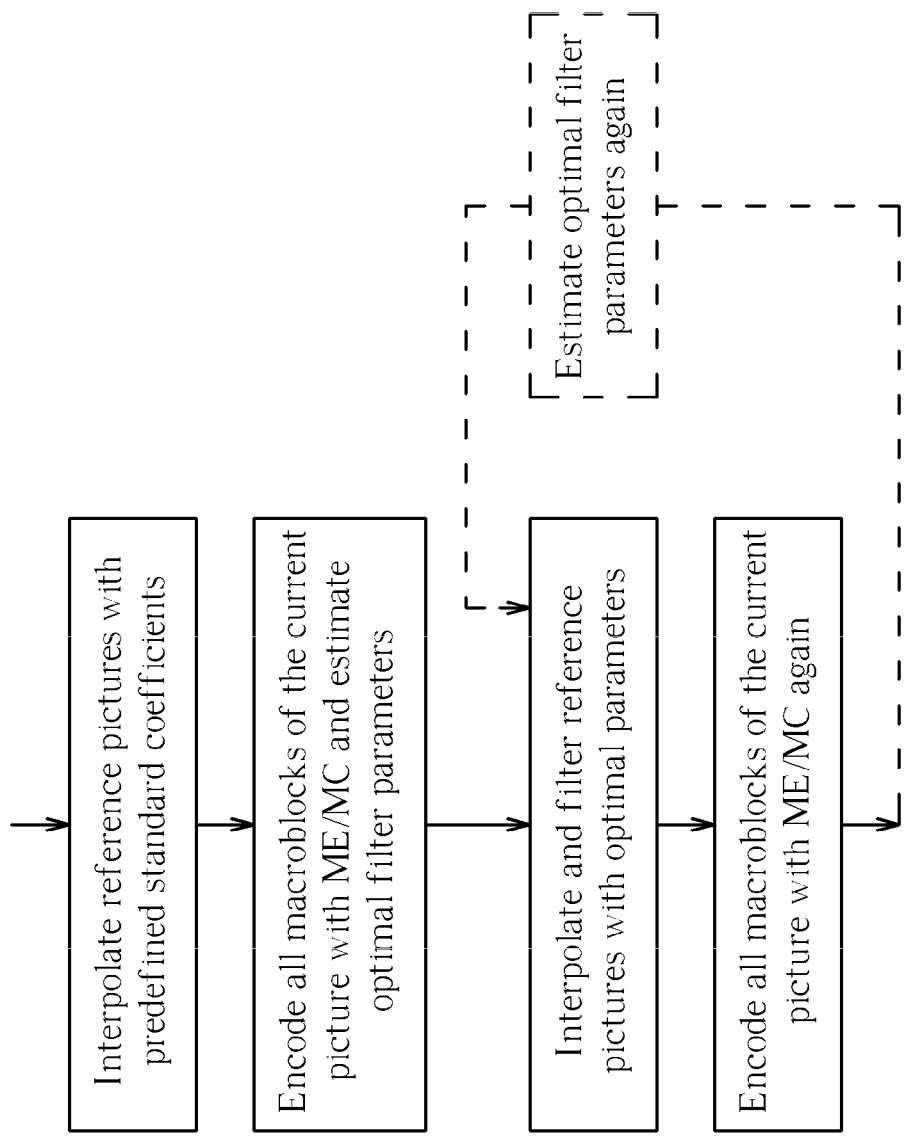
FIG. 4 is a diagram illustrating processing flow of the encoder shown in FIG. 3.

It should be noted that the use of the separate filter parameter estimator and adaptive loop filter (i.e. the apparatus shown in FIG. 5) for one-pass structure is still required if a set of filter parameters corresponding to the current picture is allowed to compete with the other sets of filter parameters for the best set of parameters. A cost function for selecting or turning off an adaptive loop filter can also be computed, and the adaptive loop filter is disabled if the corresponding cost is the smallest among the plurality of costs. The adaptive loop filter of considering the filter parameters corresponding to the current picture as well as to prior pictures is called time-sharing, or time-multiplexed, adaptive loop filter design, and it can be realized by either a one-pass (e.g. FIG. 5) or a two-pass (e.g. FIG. 1) structure. The limit of the number of sets of parameters that can be stored is according to a designer's considerations. The above-mentioned region-based filtering can also be applied to this concept.

As mentioned above, rate-distortion criteria can be utilized to determine the cost of performing adaptive loop filtering. If a plurality of filtering parameters corresponding to a plurality of pictures, respectively, is stored in the memory, costs for all sets of parameters can be compared to determine which set of filter parameters is the best set to use. In some embodiments, a cost for turning off the adaptive loop filter is also computed and compared to other costs, and the adaptive loop filter is disabled if the corresponding cost is the smallest among the plurality of costs.

The time-delayed or time-sharing adaptive loop filter can provide a filter index to entropy coding in order to insert the filter index in the bitstream generated by the video encoder. The filter index inserted in the bitstream is an indicator for the video decoder to select the set of parameters used in the video encoder. For example, if the time-sharing adaptive loop filter selects a best set of parameters corresponding to a picture that is one picture prior to a current picture in coding order, the filter index inserted in the bitstream indicates the video decoder to choose the set of parameters of a t-1 picture (one picture prior to the current picture in coding order) for the current picture.

Figure 9:
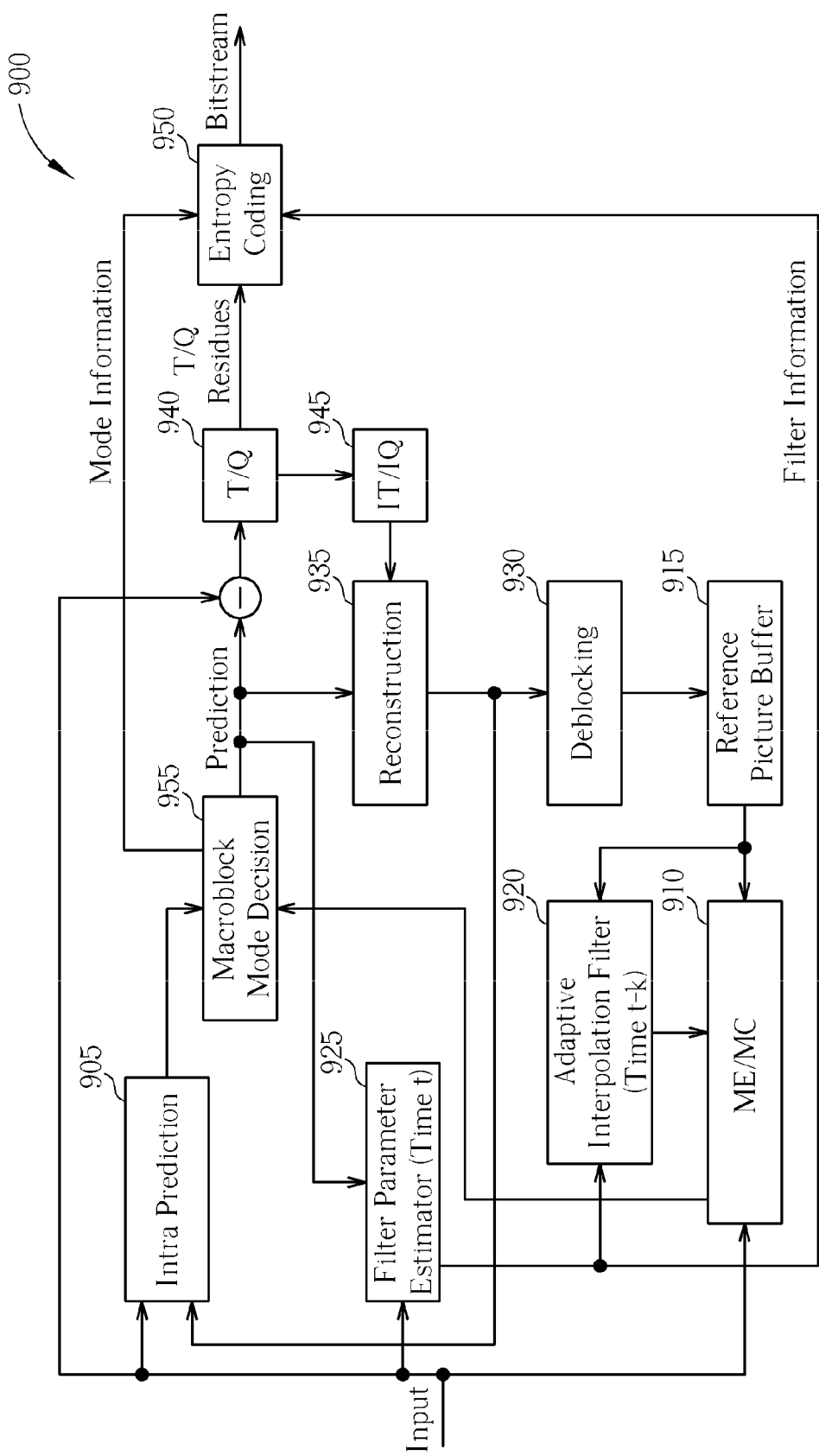
FIG. 9 is a diagram of a video encoder according to a third embodiment of the present invention.

FIG. 9 is a diagram of a video encoder according to a third embodiment of the invention. This method assumes that the change between several consecutive pictures is not significant if there is no scene change in these pictures. Therefore a current picture can use the interpolation filter parameters of prior pictures to apply on a reference picture for MC/ME. In this way, estimation of filter parameters and filtering of reference pictures can be performed in parallel, thereby achieving one-pass encoding without processing the encoding loop twice or more. The video encoder comprises: an ME/MC unit 910; an intra prediction unit 905; a macroblock mode decision unit 955; a reference picture buffer 915; an adaptive interpolation filter 920; a filter parameter estimator 925; a reconstruction unit 935; a T/Q unit 940; an IT/IQ unit 945; and an entropy coding unit 950. As can be seen from the diagram, the adaptive interpolation filter is in two parts: the first part, filter parameter estimator 925, is coupled between the macroblock mode decision unit 955 and adaptive interpolation filter 920; and the second part, adaptive interpolation filter 920, is coupled between the reference picture buffer 915 and the ME/MC unit 910.

Figure 10:
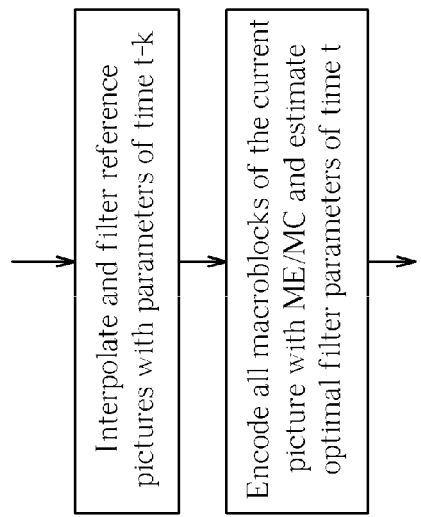
FIG. 10 is a diagram illustrating processing flow of the encoder shown in FIG. 9.

When a current picture goes through the encoding process, the filter parameter estimator 925 will collect data at macroblock level, which will be used to compute adaptive interpolation filter parameters. In particular, after mode decision, block partition and motion vectors of a current macroblock can be achieved, and these information will be used to generate an autocorrelation matrix of reference pixels (i.e. a to-be-filtered signal) and a cross-correlation vector between original pixels and the reference pixels. The autocorrelation matrix and cross-correlation vector can be accumulated macroblock by macroblock. After all macroblocks are encoded, the filter parameter estimator will solve Wiener-Hopf equations for each sub-pixel position and get the interpolation filter parameters which can minimize the prediction error between pixels of a current picture and predicted pixels. The computed filter parameters will be used for next pictures in coding order. This is called time-delayed adaptive interpolation filter design. The adaptive interpolation filter 920 will interpolate the reference picture according to previously estimated interpolation filter parameters. In this way, the entire encoding loop need only be performed once, and therefore one-pass encoding is achieved. The processing flow is illustrated in FIG. 10.

The filter parameters of a current picture can be written into the bitstream of the current picture or next pictures in coding order according to different application environments. For the first case, the time delay parameter for previous pictures will be pre-defined, and therefore the filter parameters will be written into the bitstream of the current picture. For example, when time delay parameter k is set as 2, filter parameters of a t-2 picture will be applied in a t picture and then transmitted together with the bitstream of the t picture. For the second case, the current picture can adaptively decide to use the filter parameters corresponding to any one of the prior pictures in coding order, and therefore the filter parameters can be transmitted without time delay. For example, the filter parameters of the t-2 picture will be applied in the t picture but transmitted together with the bitstream of the t-2 picture. In this case, a filter index will be entropy coded and inserted into the bitstream at the encoder. This filter index is an indicator for the video decoder to select the set of parameters used in the video encoder.

It should be noted that the filter parameters of time t in coding order derived from a current picture and its corresponding reference picture can also compete with filter parameters of time t-k in coding order, and this is called time-sharing adaptive interpolation filter design. In this case, the encoding scheme still requires a multi-pass picture coding structure. A straightforward method is to apply each candidate filter parameter set corresponding to a different time in a different encoding pass, then select the best one after evaluating the coding performance. A cost function/rate-distortion criterion is utilized to determine the benefits of the coding performance at frame level for applying each filter parameter set in the encoding pass.

The time-sharing process also provides a simplified two-pass encoding method in terms of reducing computing complexity and data access. In particular, after the first encoding pass, a fast rate-distortion criterion can be utilized to estimate the coding performance of the candidate filter parameter set instead of actually performing the encoding process. This fast rate-distortion criterion estimates the coding bits and distortion just using the information of the first coding pass and the candidate filter parameter sets.

One example for this method is as follows. The video encoder performs the first encoding pass using fixed standard interpolation filter parameters. After that, coding information such as modes and motion vectors can be achieved. The information is then used together with different filter parameter sets to compute coding distortion by performing an MC process. Although mismatch exists between the filter parameter sets and the coding information, the complexity can be reduced largely by this means. After selecting the filter parameter set with the minimum distortion, the second pass is performed applying this filter parameter set.

In addition, the above-mentioned region-based filtering can also be applied to above-mentioned methods. One example of this region-based filter competition is macroblock level one-pass time delay filtering. In this case, filter competition is performed at macroblock level and filter parameters of prior pictures only are used in order to achieve one pass encoding. When a current macroblock begins to be encoded, any combination of the previously computed filter parameters can be used to make mode decision in terms of rate-distortion performance, including the existing standard interpolation filter. After that, one set of filter parameters with the best performance is chosen for the current macroblock. An index for each macroblock is also entropy encoded and inserted into the bitstream to indicate which filter parameter set is used. A predictive coding process is applied when coding the index. It should be noted that the candidate filter parameter sets can also include filters derived from other methods such as different filter parameter sets trained from the same picture. The variations of this method such as expands of the candidate filter parameter sets and different region partition methods with corresponding region-based index also obey the spirit of the present inventions.

The sum of the adaptive loop filter parameters or adaptive interpolation parameters is typically very close to a particular value. This property can be applied for coding of filter parameters to save bits for the parameter to be finally transmitted. For example, to prevent increasing or decreasing the average pixel intensity the sum of parameters can be assumed to be 1.0, and the last parameter in the bitstream can be predicted by 1.0 minus the sum of the remaining parameters.

Figure 11:
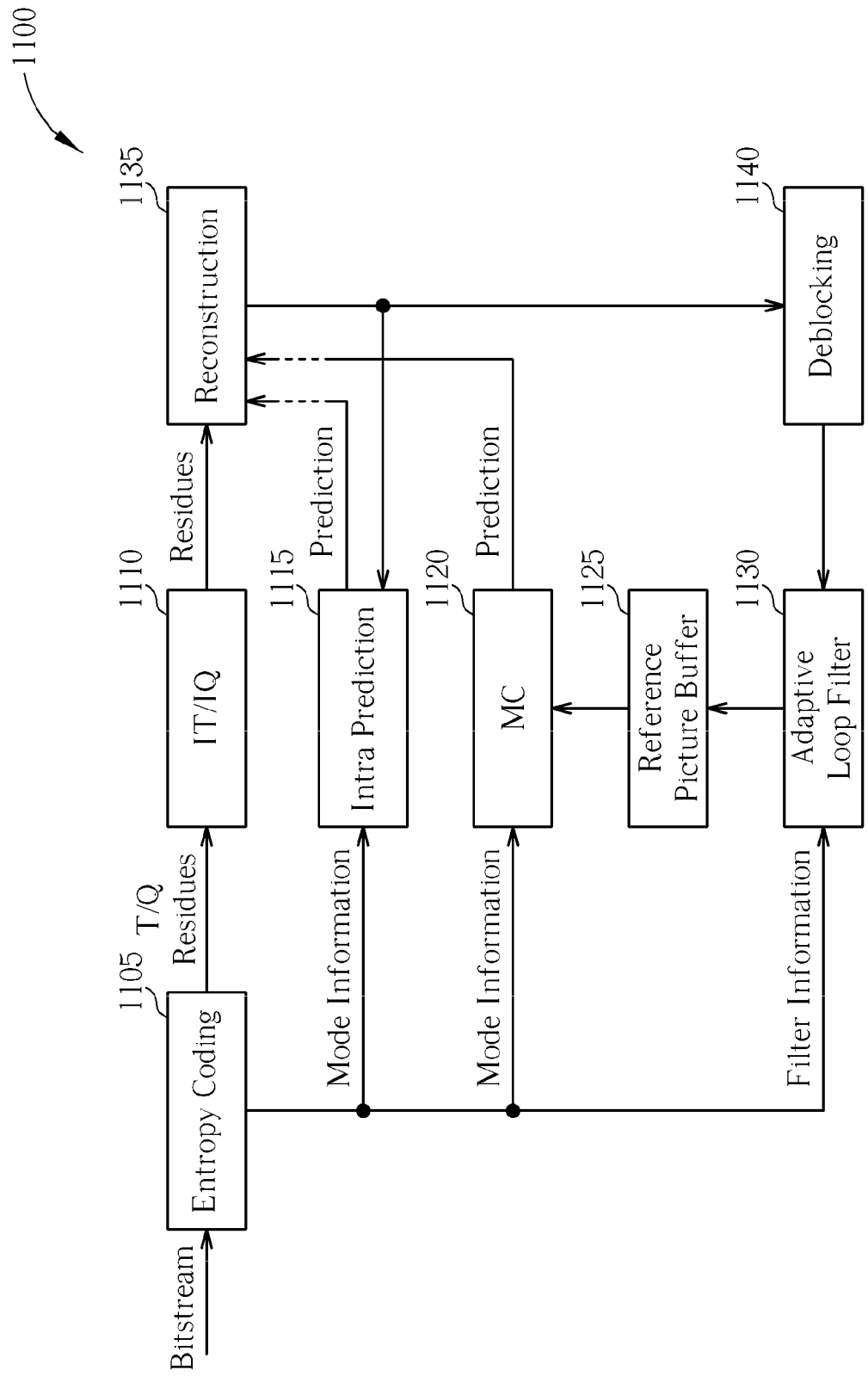
FIG. 11 is a diagram of a video decoder according to the prior art of adaptive loop filtering in FIG. 1.
Figure 12:
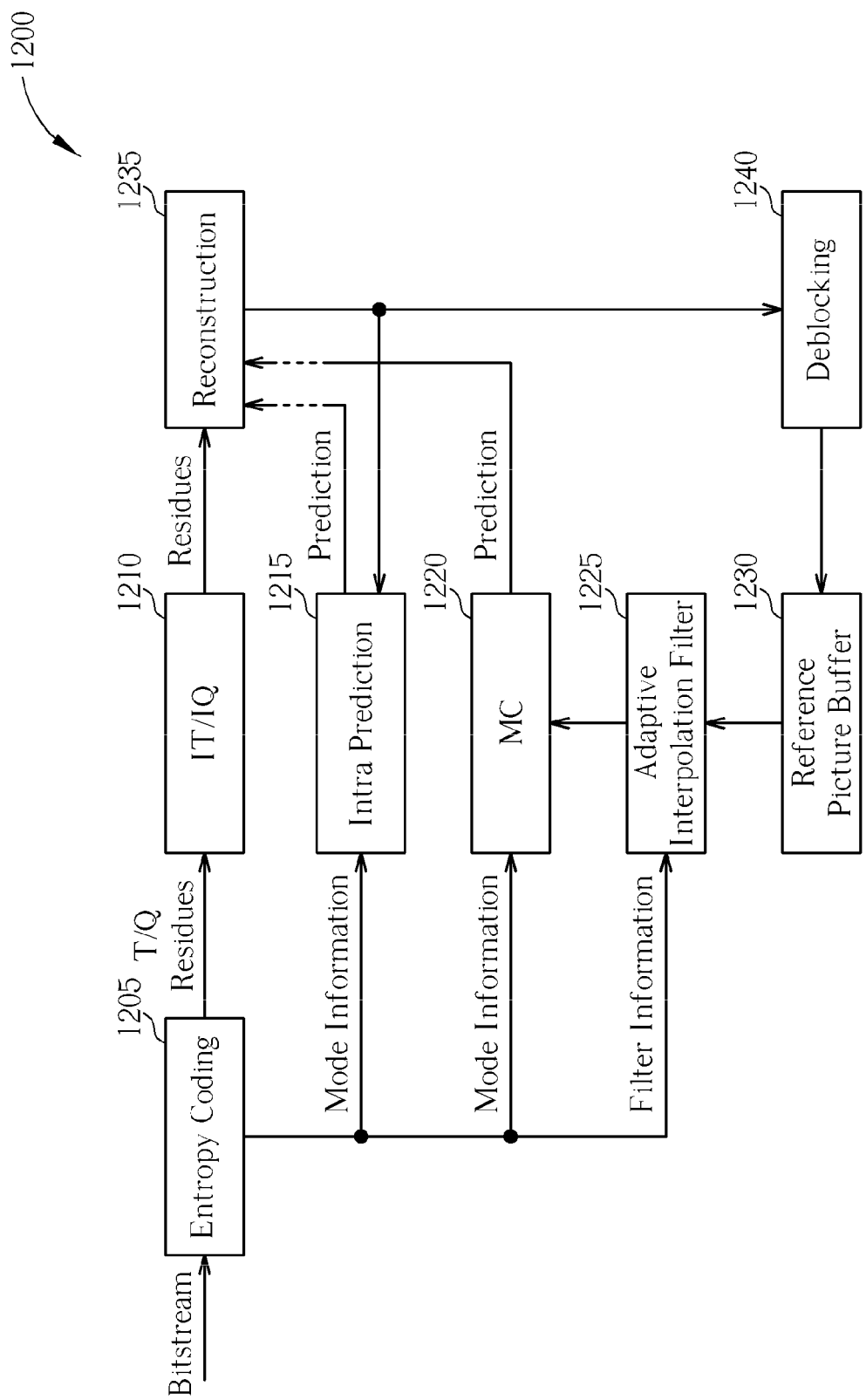
FIG. 12 is a diagram of a video decoder according to the prior art of adaptive interpolation filtering in FIG. 3.
Figure 13:
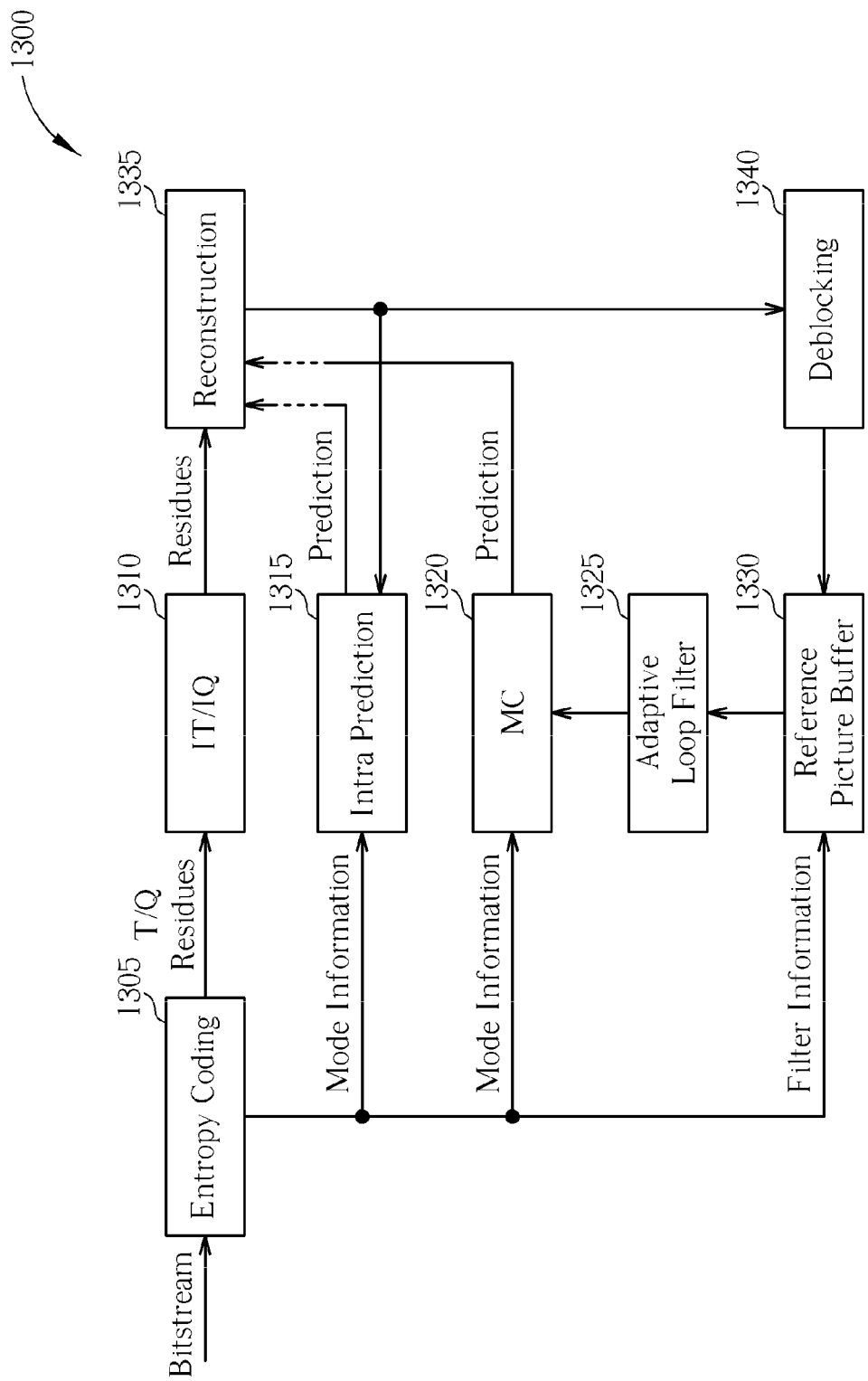
FIG. 13 is a diagram of a video decoder according to a fourth embodiment of the present invention.

FIG. 13 is a diagram of a video decoder according to a fourth embodiment of the present invention. This is a video decoder for decoding the encoded bitstream generated by the encoder shown in FIG. 5, comprising: an entropy decoding unit 1305, for parsing an encoded bitstream; an IT/IQ unit 1310, for converting the residue signal from the frequency domain to the spatial domain with correct scale; an intra prediction unit 1315, for generating the intra prediction samples; an MC unit 1320, for generating the inter prediction samples; a reconstruction unit 1335, for generating the reconstructed samples of a current picture; a deblocking unit 1340, for reducing blocky artifacts of the reconstructed picture; a reference picture buffer 1330, for storing the deblocked picture as a reference picture of following pictures; and an adaptive loop filter 1325, coupled between the reference picture buffer 1330 and the MC unit 1320, for filtering reference pictures with the corresponding filter parameters stored in the reference picture buffer to generate samples for MC. Please note that the interpolation process of MC and the adaptive loop filter process can be combined as two cascading functional blocks or as one multi-function block due to the linearity. Since the encoder shown in FIG. 5 is logically equivalent to the encoder shown in FIG. 1 (i.e. they can generate exactly the same bitstream with proper settings), the bitstream generated by the encoder shown in FIG. 5 can be properly decoded by the decoder shown in FIG. 11. Similarly, the bitstream generated by the encoder shown in FIG. 1 can also be properly decoded by the decoder shown in FIG. 13.

Figure 14:
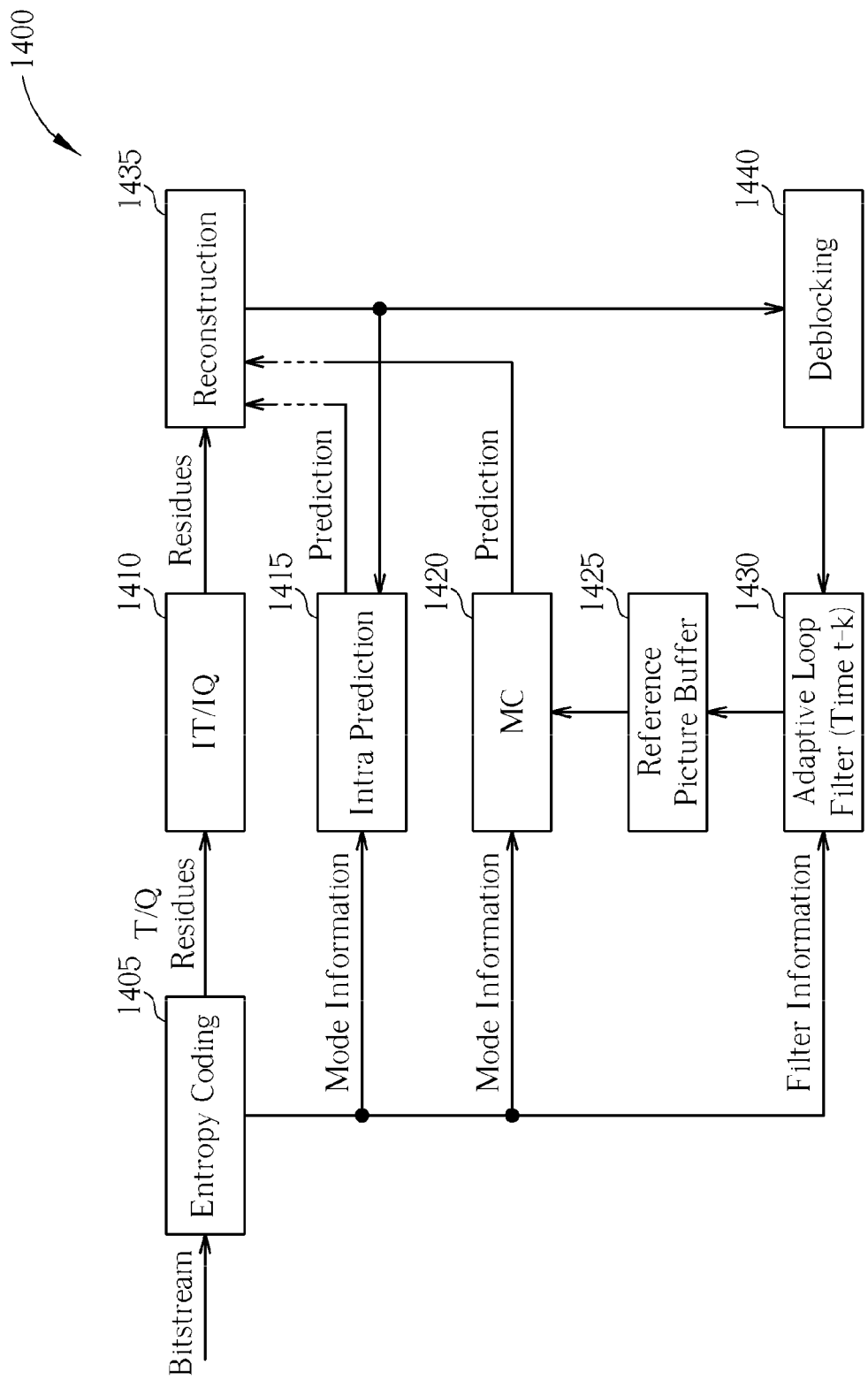
FIG. 14 is a diagram of a video decoder according to a fifth embodiment of the present invention.

FIG. 14 is a diagram of a video decoder according to a fifth embodiment of the present invention. This is a video decoder for decoding the encoded bitstream generated by the encoder shown in FIG. 7, comprising: an entropy decoding unit 1405, for parsing an encoded bitstream; an IT/IQ unit 1410, for converting the residue signal from the frequency domain to the spatial domain with correct scale; an intra prediction unit 1415, for generating the intra prediction samples; an MC unit 1420, for generating the inter prediction samples; a reconstruction unit 1435, for generating the reconstructed samples of a current picture; a deblocking unit 1440, for reducing blocky artifacts of the reconstructed picture; a reference picture buffer 1425, coupled between an adaptive loop filter 1430 and the MC unit 1420, for storing the filtered picture as a reference picture of following pictures; and an adaptive loop filter 1430, coupled between the deblocking unit 1440 and the reference picture buffer 1425, for filtering deblocked pictures with previously decoded filter parameters to generate reference pictures. The adaptive loop filter 1430 has a memory to store the filter parameters decoded from the bitstream of prior pictures. This is called time-delayed adaptive loop filtering. Please note that if the filter parameters of time t in coding order can compete with those of prior pictures of time t-k in coding order, which is called time-sharing adaptive loop filtering, the adaptive loop filter 1430 will select the newly decoded filter parameters of time t in coding order or the stored filter parameters of time t-k in coding order.

Figure 15:
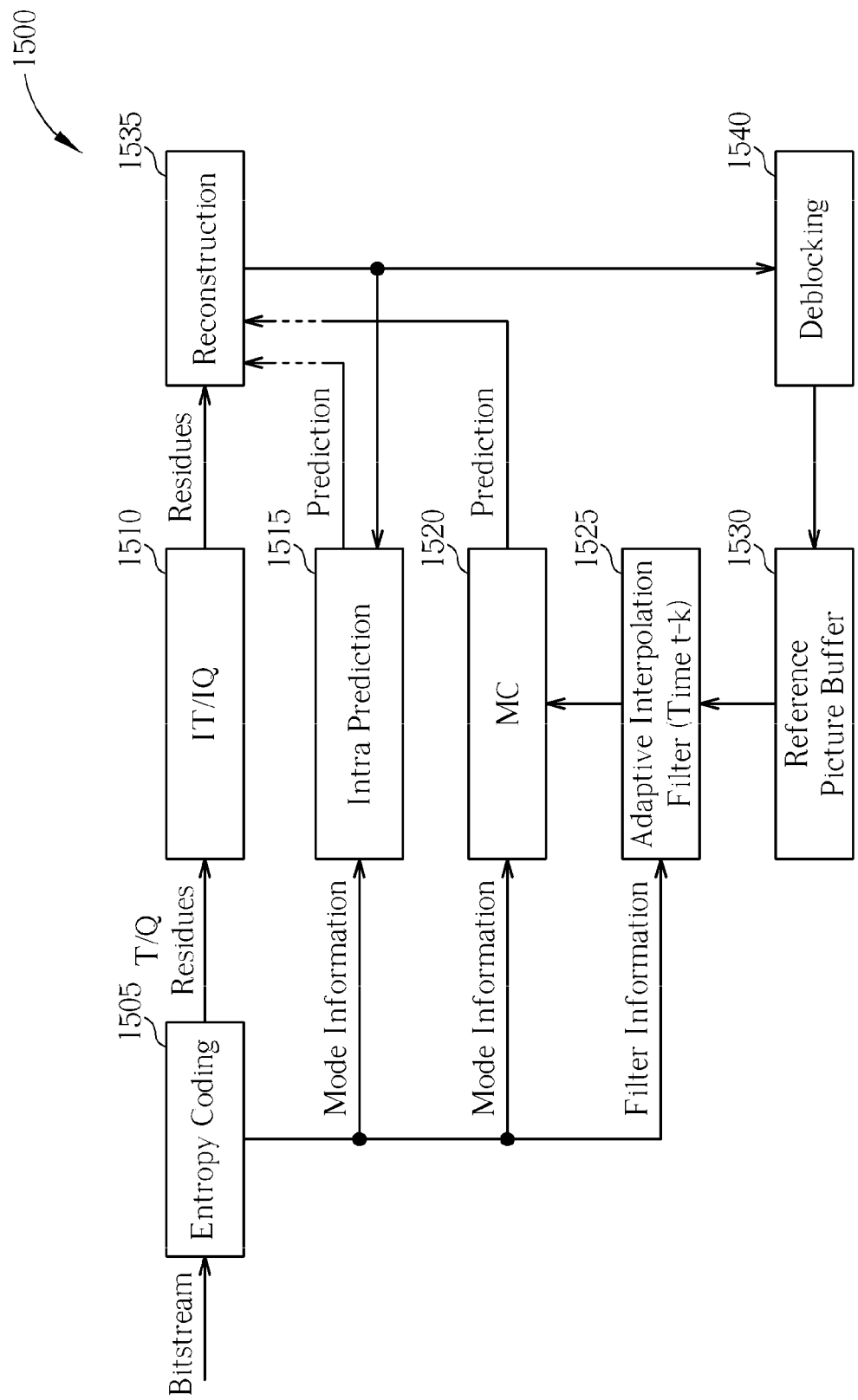
FIG. 15 is a diagram of a video decoder according to a sixth embodiment of the present invention.

FIG. 15 is a diagram of a video decoder according to a sixth embodiment of the present invention. This is a video decoder for decoding the encoded bitstream generated by the encoder shown in FIG. 9, comprising: an entropy decoding unit 1505, for parsing an encoded bitstream; an IT/IQ unit 1510, for converting the residue signal from the frequency domain to the spatial domain with correct scale; an intra prediction unit 1515, for generating the intra prediction samples; an MC unit 1520, for generating the inter prediction samples; a reconstruction unit 1535, for generating the reconstructed samples of a current picture; a deblocking unit 1540, for reducing blocky artifacts of the reconstructed picture; a reference picture buffer 1530, for storing the deblocked picture as a reference picture of following pictures; and an adaptive interpolation filter 1525, coupled between the reference picture buffer 1530 and the MC unit 1520, for interpolating and filtering reference pictures with previously decoded filter parameters to generate samples for MC. The adaptive interpolation filter 1525 has a memory to store the filter parameters decoded from the bitstream of prior pictures. This is called time-delayed adaptive interpolation filtering. Please note that if the filter parameters of time t in coding order can compete with those of prior pictures of time t-k in coding order, which is called time-sharing adaptive interpolation filtering, the adaptive loop filter 1530 will select the newly decoded filter parameters of time t in coding order or the stored filter parameters of time t-k in coding order.

In summation, the present invention provides a number of apparatus and methods that can achieve filtering of data with less access of a DRAM and less computation effort. In addition, the one-pass architecture allows greater computational efficiency of rate-distortion determination, and the region-based filtering, time-delayed adaptive filtering, and time-sharing adaptive filtering provide more flexible selections, meaning that filtering process can be performed more effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video encoder that utilizes adaptive loop filtering for coding video data, comprising:
   a prediction unit, for performing prediction techniques according to original video data and reconstructed video data to generate prediction samples;
   a reconstruction unit, coupled to the prediction unit, for reconstructing the prediction samples to form the reconstructed video data;
   a reference picture buffer, for storing the reconstructed video data as reference pictures and storing corresponding filter parameters;
   a filter parameter estimator, coupled between the reconstruction unit and the reference picture buffer, for estimating filter parameters according to the original video data of a reference picture and the reconstructed video data of the reference picture, and storing the filter parameters in the reference picture buffer; and
   an adaptive loop filter, coupled between the reference picture buffer and the prediction unit, for filtering the reconstructed video data of the a reference picture according to the corresponding stored filter parameters of the reference picture to generate a filtering result and provide the filtering result directly to the prediction unit, wherein the adaptive loop filter receives the corresponding stored filter parameters of the reference picture from the reference picture buffer;
   wherein the filter parameter estimator comprises a rate-distortion determination unit, for utilizing a rate-distortion criterion to determine whether or not to utilize the adaptive loop filter for performing filtering.

2. The video encoder according to claim 1, wherein the rate-distortion determination unit determines whether or not to utilize the adaptive loop filter for performing filtering according to the autocorrelation of the reconstructed video data of the reference picture in coding order, crosscorrelation between the original video data and the reconstructed video data of the reference picture in coding order, and the estimated filter parameters.

3. The video encoder according to claim 2, wherein the rate-distortion determination unit performs the rate-distortion criterion for each set of estimated filter parameters, to determine a set of filter parameters to be utilized by the adaptive loop filter.

4. The video encoder according to claim 2, wherein the rate-distortion determination unit performs the rate-distortion criterion for each set of estimated filter parameters from a plurality of filter parameters corresponding to a plurality of prior pictures in coding order, to determine the set of filter parameters to be utilized by the adaptive loop filter.

5. The video encoder according to claim 2, wherein the rate-distortion criterion is determined for a particular region of the current picture.

6. The video encoder according to claim 1, wherein the filter parameter estimator provides a filter index to be inserted in a bitstream for indicating which set of filter parameters is used.

7. The video encoder according to claim 1, wherein the adaptive loop filter further performs interpolation filtering on the reconstructed video data in a linearly combined manner for sharing multiplier resources.

8. The video encoder according to claim 1, wherein the filter parameter estimator further performs filter parameter prediction by using the sum of filter parameters for reducing the rate of filter parameters.

9. A method of encoding video data, comprising:
performing prediction techniques according to original video data and reconstructed video data to generate prediction samples;
reconstructing the prediction samples to form the reconstructed video data;
estimating filter parameters according to the original video data of a reference picture and the reconstructed video data of the reference picture by utilizing a rate-distortion criterion to determine whether or not to perform filtering, and storing the estimated filter parameters with the reconstructed video data of the reference picture in a buffer;
accessing the stored estimated filter parameters from the buffer;
filtering the reconstructed video data of the reference picture utilizing the stored estimated filter parameters of the reference to generate a filtering result and provide the filtering result directly for performing the prediction techniques; and
performing motion estimation between the original video data of a current picture and the filtered reconstructed video data of the reference picture.

10. The method according to claim 9, utilizing the rate-distortion criterion to determine whether or not to perform filtering is performed according to the autocorrelation of the reconstructed video data of the reference picture in coding order, crosscorrelation between the original video data and the reconstructed video data of the reference picture in coding order, and the estimated filter parameters.

11. The method according to claim 10, wherein the rate-distortion criterion is determined for a particular region of the current picture.

12. The method according to claim 9, wherein the step of estimating filter parameters further comprises:
storing a plurality of estimated filter parameters; and
performing a rate-distortion criterion for each set of estimated filter parameters, to determine a set of filter parameters to be utilized.

13. The method according to claim 9, further comprising inserting a filter index in a bitstream for indicating a set of filter parameters to be utilized.

14. The method according to claim 9, wherein the step of utilizing the estimated filter parameters to perform filtering on the reconstructed video data combines interpolation for sharing multiplications.

15. The method according to claim 9, wherein the step of estimating filter parameters further comprises performing filter parameter prediction by using the sum of filter parameters for reducing the rate of filter parameters.

16. A video encoder that utilizes adaptive loop filtering for coding video data, comprising:
a prediction unit, for performing prediction techniques according to original video data and reconstructed video data to generate prediction samples;
a reconstruction unit, coupled to the prediction unit, for reconstructing the prediction samples to form the reconstructed video data;
a reference picture buffer, for storing the reconstructed video data as reference pictures and storing corresponding filter parameters;
a filter parameter estimator, coupled to the reconstruction unit, for estimating filter parameters according to the original video data and the reconstructed video data and storing the filter parameters in the reference picture buffer, and the filter parameter estimator comprising a rate-distortion determination unit for approximating a distortion according to autocorrelation of reconstructed video data of a prior picture in coding order and cross-correlation between the original video data and the reconstructed video data of the prior picture in coding order; and
an adaptive loop filter, coupled between the reconstruction unit and the prediction unit, for filtering the reconstructed video data according to the corresponding stored filter parameters, wherein the adaptive loop filter receives the corresponding stored filter parameters of the reference picture from the reference picture buffer, wherein the rate-distortion determination unit utilizes a rate-distortion criterion to determine whether or not to utilize the adaptive loop filter for performing filtering according to the approximated distortion and the estimated filter parameters.

17. The video encoder according to claim 16, wherein the rate-distortion determination unit performs a rate-distortion criterion for each set of estimated filter parameters, to determine a set of filter parameters to be utilized by the adaptive loop filter.

18. The video encoder according to claim 16, wherein the rate-distortion determination unit performs a rate-distortion criterion for each set of estimated filter parameters from a plurality of filter parameters corresponding to a plurality of prior pictures in coding order, to determine the set of filter parameters to be utilized by the adaptive loop filter.

19. The video encoder according to claim 16, wherein the rate-distortion determination unit determines a rate-distortion criterion for a particular region of a current picture.

20. The video encoder according to claim 16, wherein the filter parameter estimator provides a filter index to be inserted in a bitstream for indicating which set of filter parameters is used.

21. The video encoder according to claim 16, wherein the adaptive loop filter further performs interpolation filtering on the reconstructed video data in a linearly combined manner for sharing multiplier resources.

22. A method of encoding video data, comprising:
performing prediction techniques according to original video data and reconstructed video data to generate prediction samples;
reconstructing the prediction samples to form the reconstructed video data;
storing the reconstructed video data as reference pictures and storing corresponding filter parameters;
estimating filter parameters according to the original video data and the reconstructed video data;
approximating a distortion according to autocorrelation of reconstructed video data of a prior picture in coding order and crosscorrelation between the original video data and the reconstructed video data of the prior picture in coding order;
filtering the reconstructed video data utilizing the corresponding stored filter parameters; and
utilizing a rate-distortion criterion to determine whether or not to perform filtering according to the approximated distortion and the estimated filter parameters.

23. The method according to claim 22, wherein the rate-distortion criterion is determined for a particular region of a current picture.

24. The method according to claim 22, further comprising performing a rate-distortion criterion for each set of estimated filter parameters to determine a set of filter parameters to be utilized.

25. The method according to claim 22, further comprising inserting a filter index in a bitstream for indicating a set of filter parameters to be utilized.

* * * * *